United States Patent Office 3,531,881
Patented Oct. 6, 1970

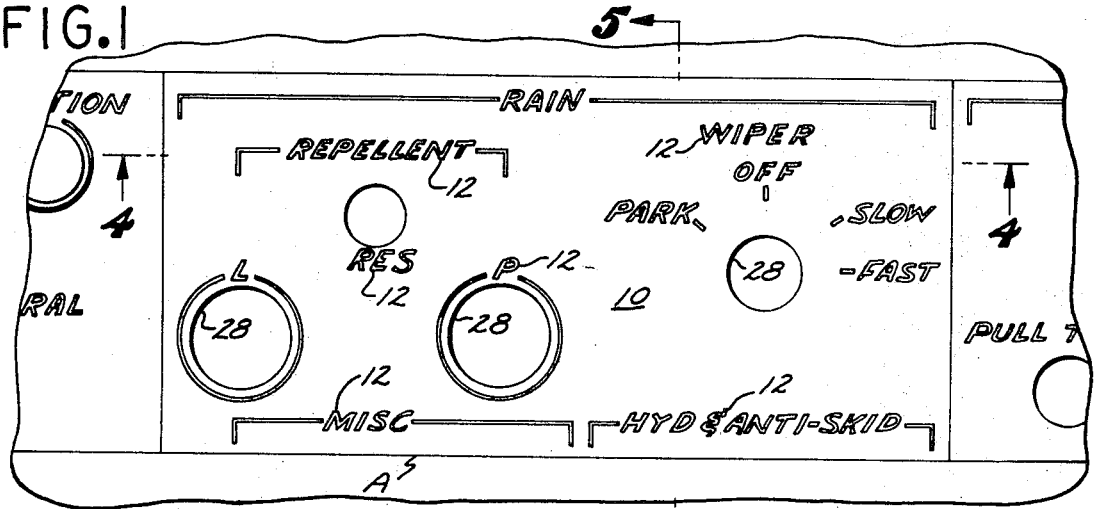
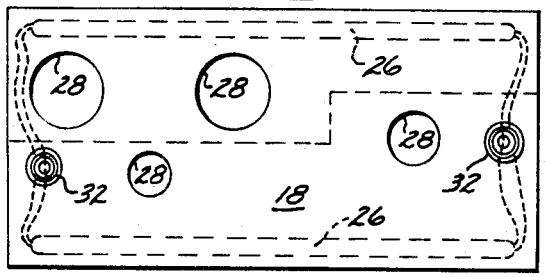
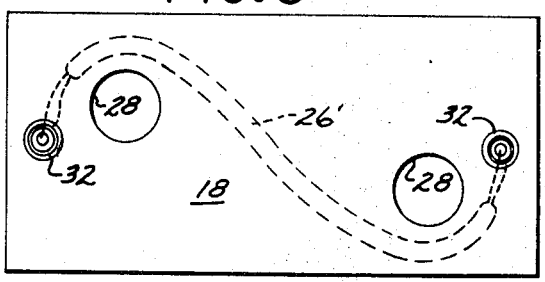
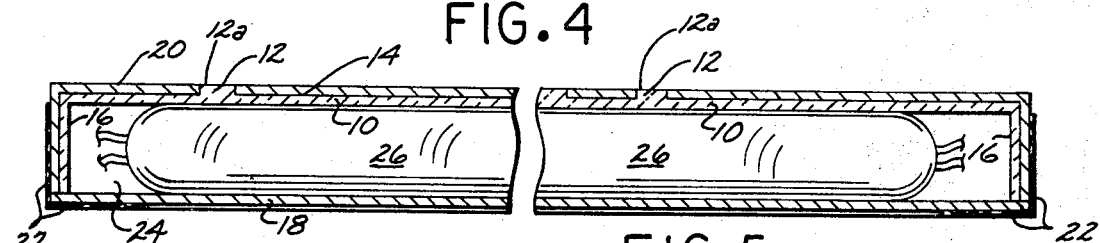
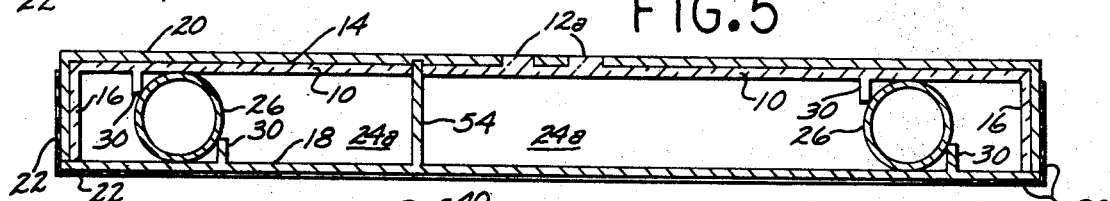
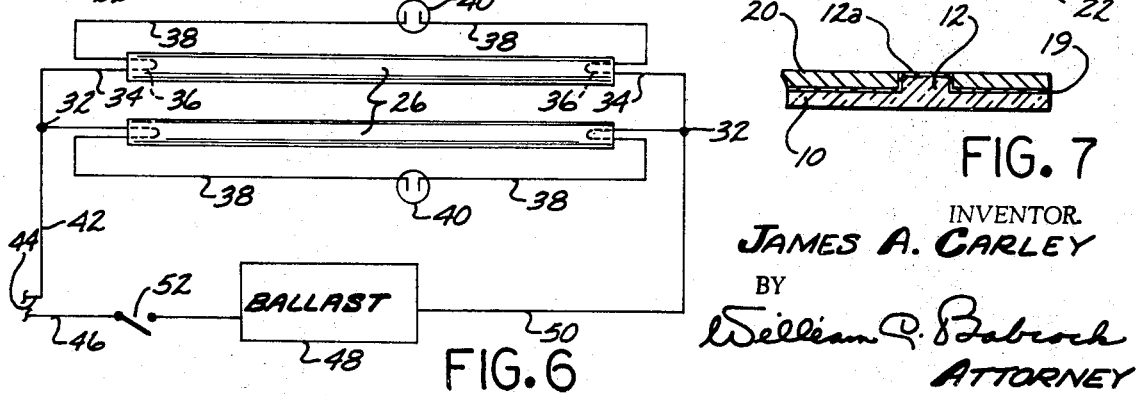

3,531,881
INSIGNIA-BEARING PANEL ASSEMBLY
James A. Carley, Rolling Hills, Calif., assignor to Los Angeles Miniature Products, Inc., Gardena, Calif., a corporation
Filed Feb. 15, 1968, Ser. No. 705,688
Int. Cl. G09f 13/08
U.S. Cl. 40—130
8 Claims

ABSTRACT OF THE DISCLOSURE

A panel assembly particularly adapted for use on the dashboard of vehicles, which assembly includes a panel carrying at least one insignia that is clearly visible in daylight and illuminable to a uniform intensity in the dark, with the intensity remaining uniform, even after the assembly has been in use over a prolonged period of time. High voltage may be used as a source of energy to illuminate the insignia, with a corresponding low current draw, and a reduction in weight of the panel assembly, inasmuch as no step-down transformer is required and the size of electrical conductors may be reduced. One or more fluorescent tubes are used with the panel to transform the high voltage current to a blanket of light against which the insignia may be seen in the darkness, with the tubes having the operational advantages of a long life, resistance to shock, and no degradation in light output, such as is the case when incandescent bulbs or electro-luminescent units are employed as a source of light.

BACKGROUND OF THE INVENTION

Field of the invention

A lightweight panel assembly particularly adapted for use on the dashboard of a vehicle, which panel carries at least one insignia that is of a contrasting color to that of the panel, with the assembly being capable of illuminating the insignia to the same intensity, even after it has been used over a prolonged period of time.

Description of the prior art

In the past, various types of edge-lighted panels have been used on the dashboards of aircraft and automotive vehicles, and while they illuminated various insignias defined on such panels, the operational disadvantages thereof have been due to the numerous sockets and miniature incandescent bulbs used therein, the complicated structure thereof, the extensive and intricate wiring incorporated therein, as well as the use of a heavy step-down transformer, all of which make them expensive to produce.

The present invention eliminates a number of the operational problems encountered in the manufacture and use of illuminable panel structures by providing one that is lighter in weight, simpler structurally, of greater durability, more certain in operation, and which is substantially less expensive to produce.

SUMMARY OF THE INVENTION

A lightweight panel structure carrying at least one insignia that is visible in daylight and may be rendered visible at night in any desired color by means of a high voltage fluorescent tube which is highly resistant to shock and breakage, enjoys a long operational life without reduction of light output, even after the assembly has been used for a prolonged period of time.

A major object of the present invention is to provide a simple lightweight insignia-bearing panel assembly that is energized by at least one high voltage fluorescent tube to render insignia on said panel visible in the dark with a fixed light intensity and in a desired color, with this light intensity remaining substantially constant, even after the assembly has been used over a prolonged period of time.

Another object of the invention is to provide an illuminable insignia-bearing panel requiring no printed circuits, embedded lamps or a step-down transformer, has a low current draw, and uses electrical conductors of a lower size than in previous installations of this nature, all to the end of producing a less expensive, more compact assembly than available heretofore.

BRIEF DESCRIPTION OF THE DRAWING

FIG. 1 is a front elevational view of one of the insignia-bearing panels, showing additional panels in abutting relationship therewith;

FIG. 2 is a rear elevational view of a first form of panel;

FIG. 3 is a rear elevational view of a second form of panel;

FIG. 4 is a longitudinal cross-sectional view of the panel shown in FIG. 1, taken on the line 4—4 thereof;

FIG. 5 is a transverse cross-sectional view of the panel shown in FIG. 1, taken on the line 5—5 thereof;

FIG. 6 is a diagrammatic view of the electrical circuit used in the panel assembly; and FIG. 7 is a cross section of an alternate form of panel wall.

DESCRIPTION OF THE PREFERRED EMBODIMENT

The general arrangement of each panel assembly A is shown in FIGS. 1, 4, 5 and 6 of the drawing. In FIG. 1 it will be noted that a number of the panel assemblies A can be arranged in edge-abutting relationship to provide a dashboard for aircraft or other vehicles, as well as control panels and the like.

Each panel assembly A includes a plate 10, preferably rectangular, that is formed from a translucent or transparent material such as plastic, or the like. One or more raised insignia 12 are provided on the forward face 14 of plate 10. A continuous flange 16 extends rearwardly from plate 10 in the manner shown in FIG. 4. A back plate 18 of opaque material is provided that abuts against the rear edges of flange 16.

If desired, the material from which plate 10 is fabricated may be colored, or include a phosphorescent material as an integral part thereof. An opaque layer 20 is bonded to the flange 16 and forward face 14 of the panel assembly A, except for the forward extremities 12a of the insignia 12. The layer 20 is preferably plastic, and may be the same material from which plate 10 is fabricated. The material defining plate 10 is of a contrasting color relative to that of the layer 20 in order that the forward extremities 12a of the insignia 12 are clearly visible in daylight as well as in darkness when viewed against a blanket of light provided by means to be later described.

In FIG. 4 it will be seen that the forward extremities 12a and the forward face 14 of plate 10 are substantially flush. Should it be desirable that the forward extremities 12a be of a color different from that of the panel 10, a transparent or translucent film 19 of a selected material may be interposed between panel 10 and layer 20, in the manner shown in FIG. 7. If desired, a phosphorent material (not shown) may be included as an integral part of film 19 to impart a selected color to the insignia 12 when the latter are illuminated.

The back plate 18 is preferably held in position on the rear edges of flange 16 by adhesive-coated tape 22 as shown in FIGS. 4 and 5. Panel 10, flange 16, and back plate 18 cooperatively define a confined space 24 in which one or more elongate fluorescent tubes 26 are so arranged as to provide a blanket of light against which the forward extremities 12a are viewed.

The number of tubes 26 required to provide such a blanket of light is, of course, dependent upon the size of the plate 10 and the spacing and arrangement of the insignia 12 thereon. In FIG. 5 it will be seen that two spaced, parallel, fluorescent tubes 26 are provided for this purpose. A single curved fluorescent tube 26' is shown in FIG. 3, which provides such a blanket of light. A number of openings 28 are formed in plate 10 through which knobs or dials (not shown) of various instruments project, such as are conventionally provided on the dashboard of aircraft, other vehicles, or control panels.

To prevent movement of the fluorescent tubes 26 or 26' in space 24 due to being subjected to sudden forces or shocks, the forward face of the back plate 18 or rear face of plate 10 may be provided with supporting lugs 30.

The electric circuit used in energizing the fluorescent tubes 26 and 26' are illustrated in FIG. 6. Two longitudinally spaced terminals 32 are mounted on the back plate 18, and conductors 34 extend therefrom to filaments 36 in tubes 26 or 26'. Filaments 36 are also connected by conductors 38 that extend to starter switches 40.

One of the terminals 32 is connected to a conductor 42 leading to a source of high voltage electricity 44. A conductor 46 extends from the source 44 to a ballast 48, which ballast in turn is connected by a conductor 50 to the other of the terminals 32, as illustrated in FIG. 6. When a switch 52 in conductor 46 is closed, the tubes 26 or 26' are electrically energized to provide a blanket of light in confined space 24 against which the forward extremities 12a of the insignia are seen.

The panel assembly A described herein is ideally suited for use in aircraft, for it is lightweight, simple in structure, and the fluorescent tubes 26 or 26' may be used for long periods of time without reduction of light output therefrom. Should it be desired, a partition 54 may be provided to extend between plate 10 and back plate 18 to subdivide space 24 into two compartments 24a, each of which is illuminated by one of the bulbs 26 and project a blanket of light against which insignia extremities 12a are viewed.

From the above description and an inspection of FIGS. 2, 3 and 7 of the patent drawing it will be seen that the first and second panel assemblies, as well as the alternate form thereof each includes one or more groups of insignia that are not only clearly visible in daylight, but in darkness as well when illuminated by a blanket of light of substantially uniform intensity.

What is claimed is:

1. A lightweight panel assembly carrying at least one insignia, which assembly is visible in daylight and is illuminated in darkness to a uniform intensity, even after prolonged use thereof, including:

a plate of light-transmitting material, on a first surface of which said insignia is defined and projects forwardly therefrom;

a continuous flange extending rearwardly from the outer edges of said plate;

a layer of opaque material covering said flange as well as a first side of said plate except for the forward extremities of said insignia;

a back plate extending between the rear edges of said flange;

first means for removably supporting said back plate on said flange;

at least one elongate fluorescent tube so disposed in a confined space defined by said plate, flange and back plate as to provide a substantially uniform blanket of light against which said forward extremities of said insignia are viewed when said assembly is used in the dark;

an electric circuit operatively associated with said assembly, which circuit includes a ballast, starting switch, terminals supported by said back plate, and conductors extending between said ballast switch, terminals and tube, with said circuit being connectible to a source of electrical energy of sufficiently high voltage as to actuate said tube and at least one opaque partition that divides said confined space into a plurality of compartments, each of which compartments serves to house one of said fluorescent tubes.

2. A panel assembly as defined in claim 1 which further includes:

second means for holding each of said fluorescent tubes in a fixed position relative to said plate and back plate.

3. A panel assembly as defined in claim 2 wherein said second means comprise lugs that project into said confined space from said plate, back plate which serve to define said confined space.

4. A panel assembly as defined in claim 1 which further includes:

a film of transparent or translucent material of a selected color that is interposed between said forward surface of said plate and the rear surface of said layer and is bonded thereto, which film extends over the forward extremity of said insignia to impart a selected color to said insignia when viewed by daylight as well as when said insignia is illuminated and viewed in the dark.

5. A panel assembly as defined in claim 1 wherein said plate includes a phosphorescent material as a part thereof.

6. A panel assembly as defined in claim 4 wherein said film includes a phosphorescent material as a part thereof.

7. A panel assembly as defined in claim 1 wherein said fluorescent tube is of curved configuration.

8. A panel assembly as defined in claim 1 wherein the forward surface of said opaque layer and the forward extremities of said insignia lie in a common plane.

References Cited

UNITED STATES PATENTS

| | | |
|---|---|---|
| 2,594,081 | 4/1952 | Shlenker. |
| 2,693,656 | 11/1954 | Neugass. |
| 2,753,640 | 7/1956 | McConnell. |
| 2,853,117 | 9/1958 | Dibblee. |
| 2,948,073 | 8/1960 | Roper. |
| 3,156,990 | 11/1964 | Dock. |

EUGENE R. CAPOZIO, Primary Examiner

R. CARTER, Assistant Examiner